J. A. MOORE.
MACHINE FOR NOTCHING BOX BLANKS AND THE LIKE.
APPLICATION FILED JAN. 5, 1920.

1,379,275.

Patented May 24, 1921.
6 SHEETS—SHEET 1.

Inventor:
John H. Moore,
By Attorneys.

Inventor: John A. Moore,
By Dodge and Sons
Attorneys.

UNITED STATES PATENT OFFICE.

JOHN A. MOORE, OF LOUISVILLE, KENTUCKY, ASSIGNOR TO THE MENGEL COMPANY, OF LOUISVILLE, KENTUCKY, A CORPORATION OF NEW JERSEY.

MACHINE FOR NOTCHING BOX-BLANKS AND THE LIKE.

1,379,275. Specification of Letters Patent. Patented May 24, 1921.

Application filed January 5, 1920. Serial No. 349,584.

*To all whom it may concern:*

Be it known that I, JOHN A. MOORE, a citizen of the United States, residing at Louisville, in the county of Jefferson and State of Kentucky, have invented certain new and useful Improvements in Machines for Notching Box-Blanks and the like, of which the following is a specification.

This invention pertains to an improved machine for notching box blanks and more particularly to blanks produced from corrugated paper board. The main object of the invention is to provide a machine which will cut or notch the stock cleanly and without crushing it, and to produce a structure which is automatic in its operation so that all the attendant has to do is to see that the blanks are fed or presented to the machine.

A further object of the invention is to provide means whereby the various operative elements and coöperating feed and guiding devices or mechanisms may be adjusted with facility and accuracy.

A preferred embodiment of the invention is disclosed in the annexed drawings, wherein,—

Figure 1:
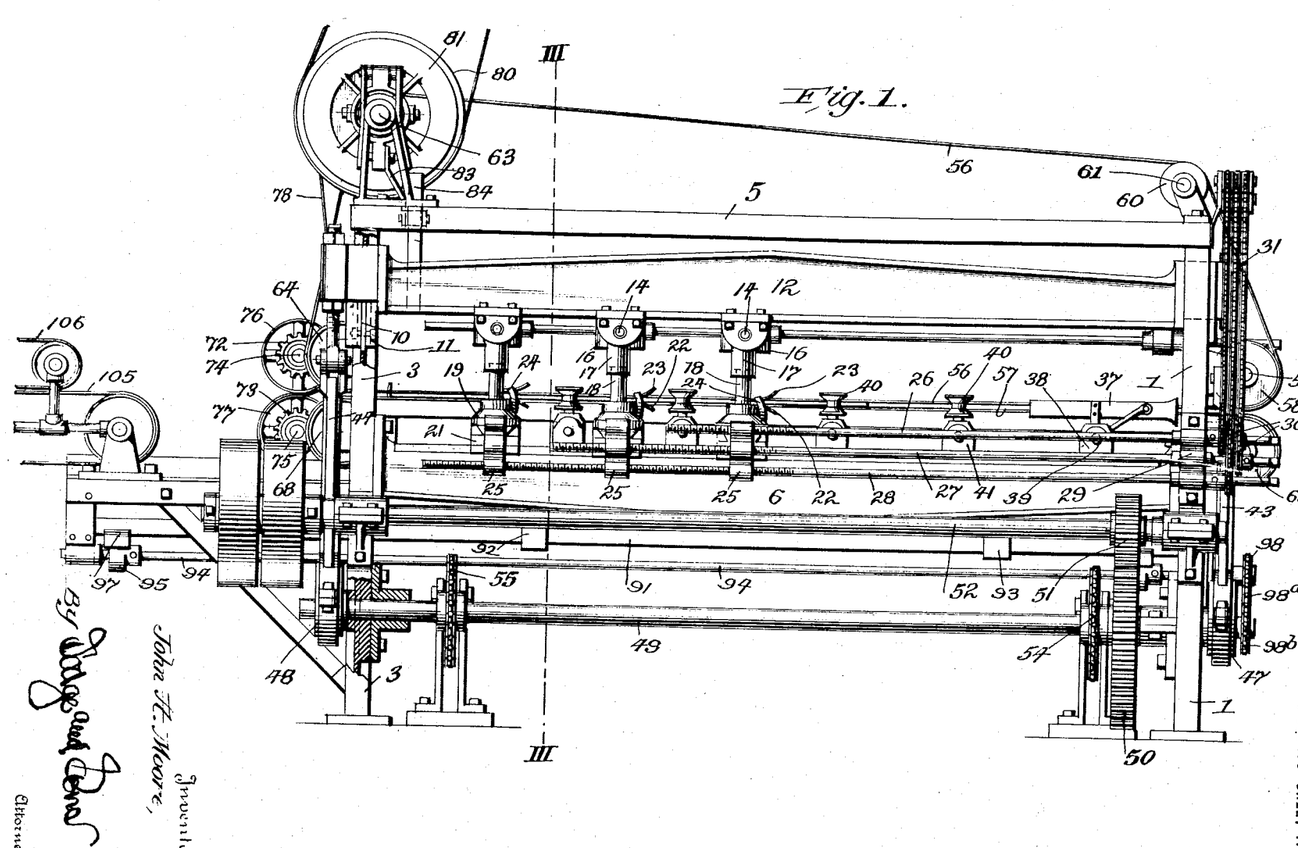
Figure 1 is a side elevation of the machine.
Figure 3:
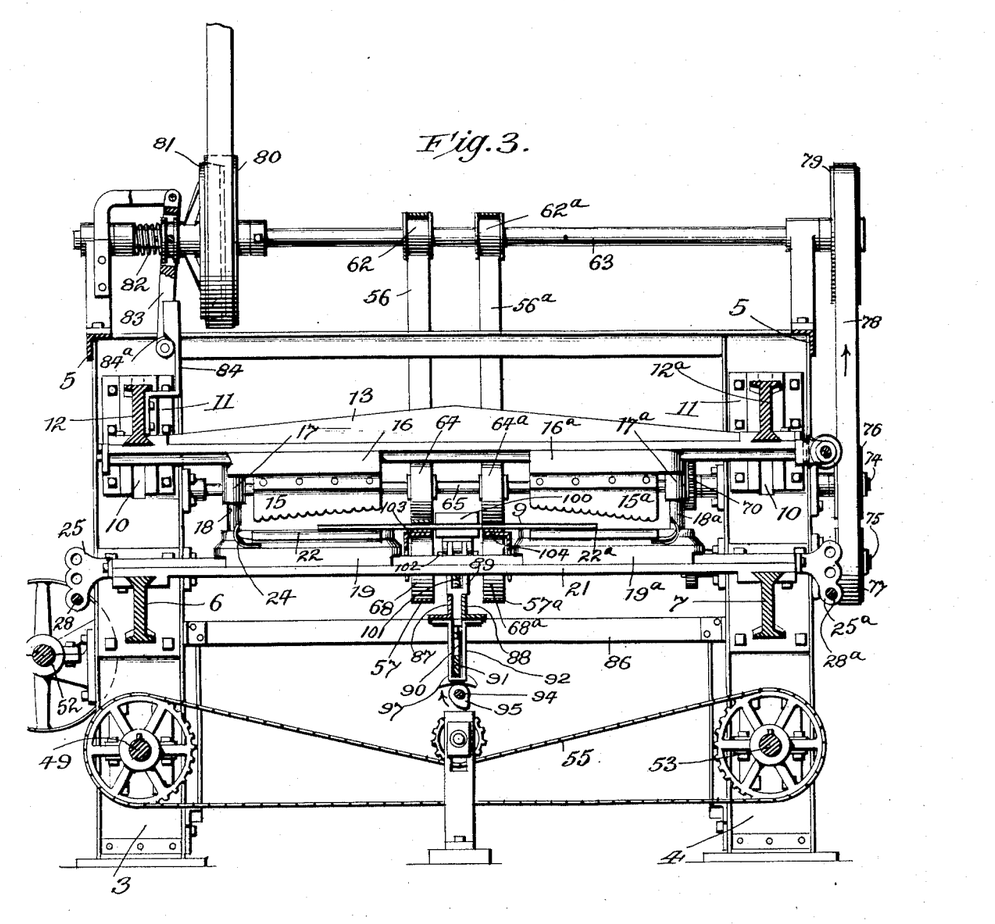
Fig. 3 a transverse vertical sectional view on the line III—III of Fig. 1.
Figure 7:
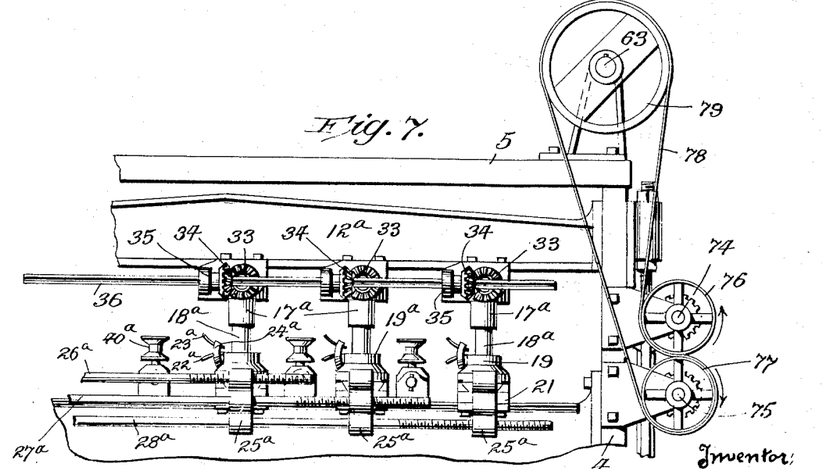
Fig. 7 a detail elevation illustrative of the means employed to effect adjustment of the knives or punching members and their coöperating die elements transversely and longitudinally of the machine.
Figures 8, 9, 10, 11:
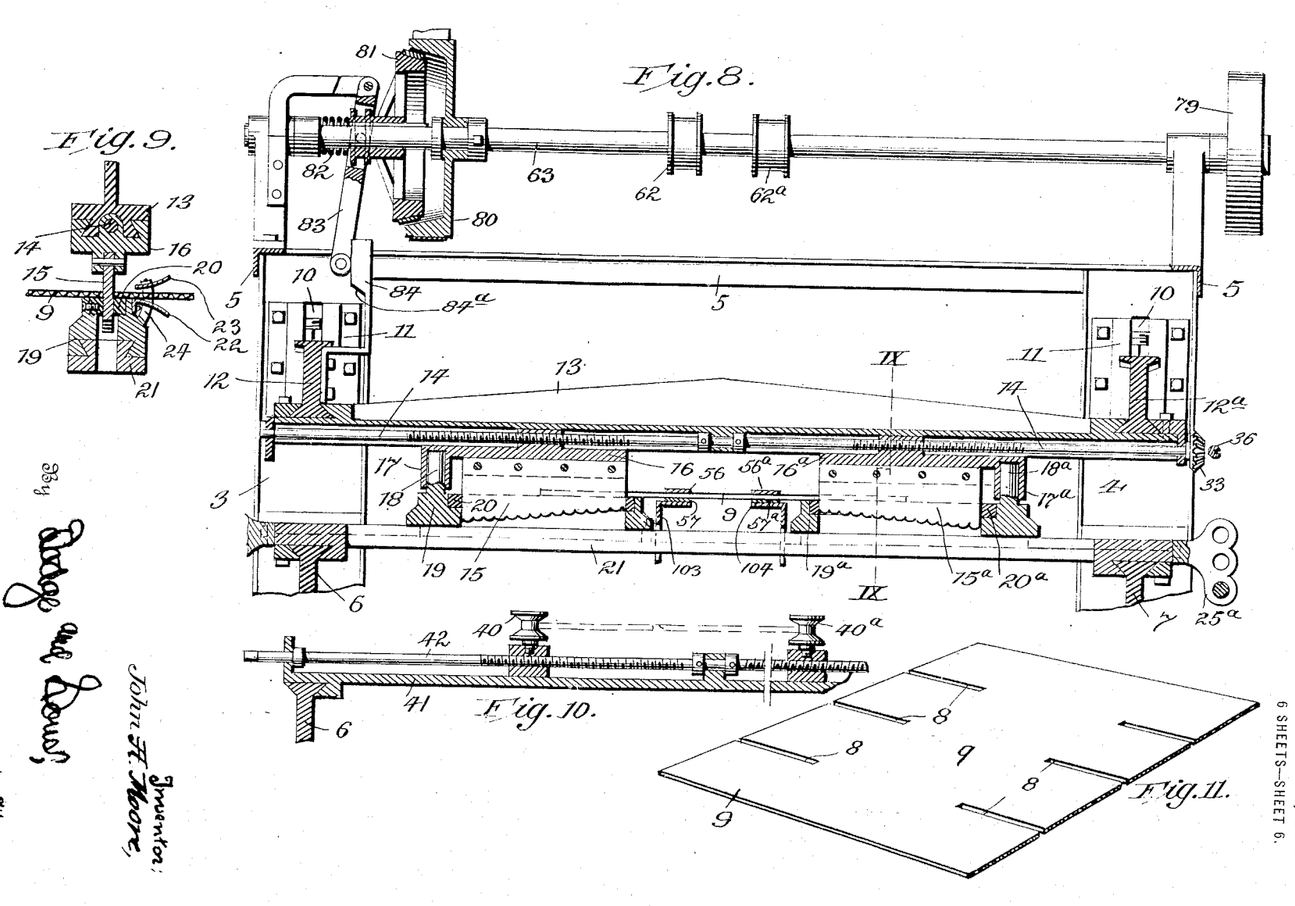
Fig. 8 a transverse vertical sectional view taken through one of the knife supporting beams, and likewise through the clutch mechanism that controls the feed belts employed for advancing the blanks or stock.
Fig. 9 a detail sectional view on the line IX—IX of Fig. 8.
Fig. 10 a detail sectional view of the edge guide adjusting means.
Fig. 11 a perspective view of one of the notched or completed blanks.

The main frame work or body of the machine comprises two front columns 1 and 2, two similar rear columns 3 and 4, connected at their upper ends by angle bars 5, and two longitudinally disposed relative heavy and rigid beams 6 and 7, which at their ends are bolted, respectively, to the columns 1 and 3, and 2 and 4. The machine is designed to form a series of slots as 8, along two opposite sides of a blank 9, see Fig. 11, and to that end a series of knives or punches and a series of coöperating dies are employed, such elements (of any desired number) being adjustable longitudinally of the machine and arranged in opposite pairs, the knives and dies of each pair being likewise adjustable toward and from each other. Thus any number of notches may be produced and the notches may be of any desired depth or length. The blanks are carried through the machine by feed belts and coöperating therewith to properly position the blanks are guides, and a suitable stop mechanism for the blanks to bring them to rest in proper relation to the knives or cutters is employed. Each of the vertical columns 1, 2, 3 and 4 is slotted adjacent its upper end, as at 10, Figs. 1, 3 and 8, and guides 11 are secured adjacent thereto for the reception of the ends of two longitudinally extending horizontally disposed beams 12 and 12$^a$ which are alike in form. Inasmuch as many of the parts are duplicated upon opposite sides of the medial line of the machine, in order to save repetition and to avoid confusion, the parts on one side will be numbered and the others similarly numbered with the added exponent $a$. Each of the beams 12 and 12$^a$ is formed with a dovetail way at its lower side, see Fig. 8, and a plurality of cross beams 13 are supported between the same and susceptible of adjustment lengthwise thereof. Each cross beam has a dovetail way formed on its lower side, see Fig. 9, and a shaft 14, reversely threaded upon opposite sides of its center is carried by said lower portion. The knives or cutters are denoted by 15 and take the form of a flat blade tapering downwardly toward their outer ends, the lower edge being preferably serrated. Each knife is secured at its upper edge in a head block 16 which is mounted to slide upon the dovetail way and is in threaded engagement with threaded shaft 14 through the movement of which the knives of the pair may be separated or caused to approach each other. Each head block at its outer end is provided with a vertically disposed hollow boss or guideway 17 into which extends a finger or stem 18 which extends upwardly from a die carrying block 19 in which is mounted a die 20 which coöperates with the knife 15. Said block 19 at its lower side is undercut and is mounted on a dovetailed way formed upon a cross beam 21, there being one of such beams for each of the overlying beams 13. Said beams are in turn slidably mounted on the beams 6 and 7, (Fig. 3). Each block 19 has secured to it at its forward side a curved plate 22, while overlying said plate in spaced relation thereto is a plate 23 supported by a bracket 24, the forward edge of such plate being given an upward curvature, the plates forming bell mouthed guides for the stock or blank. The upper plate is omitted in Fig. 3 in order to more clearly disclose the knives. Each pair of knives and their dies is designed to be bodily moved lengthwise of the machine to effect the desired spacing between the same, and to this end each of the beams 21 at each end is provided with a bracket 25 having a number of openings extending therethrough (see Fig. 3), the openings corresponding in number to the number of pairs of knives employed. Shafts 26, 27 and 28, (see Fig. 1) are threaded into the respective brackets, the intermediate shaft 27 passing freely through the opening in the first bracket below shaft 26, while the shaft 28 passes freely through the openings formed in the first and second brackets, being threaded into the last bracket or that to the left, Fig. 1. The shafts at their forward ends are supported in brackets 29 (and 29$^a$) secured to the columns 1 and 3 and each shaft has secured to it a sprocket wheel 30. Chains 31, one for each pair of sprockets, pass about said sprockets and over idlers 32 located at the upper portion of the machine frame. The outer end of each of the shafts 26, 27 and 28 is squared so that by applying a wrench the shaft may be turned and, through the sprocket chain, the corresponding shaft on the opposite side will be rotated. Such rotation will shift the beam 21 and through such arrangement the spacing of the knives with their coöperating parts along the bed may be readily effected. The head blocks 16 and 16$^a$ and the underlying blocks 19 and 19$^a$ are designed to be adjusted endwise toward and from each other in unison to effect the desired depth of notch formed in the opposite edge of the stock. To this end each of the shafts 14 is provided with a bevel pinion 33, (Figs. 7 and 8) which meshes with a similar pinion 34 sleeved in a suitable bracket 35, a splined shaft 36 passing through said pinion 34 and actuating the latter when power is applied to the forward squared end of said shaft (see Figs. 1 and 6). Thus it will be seen that through the manipulation of the shafts 26, 27 and 28, and the shaft 36, the knives and their coöperating parts may be spaced apart along the machine and may be moved in and out endwise to regulate the depth of notch which is formed.

Figure 6:
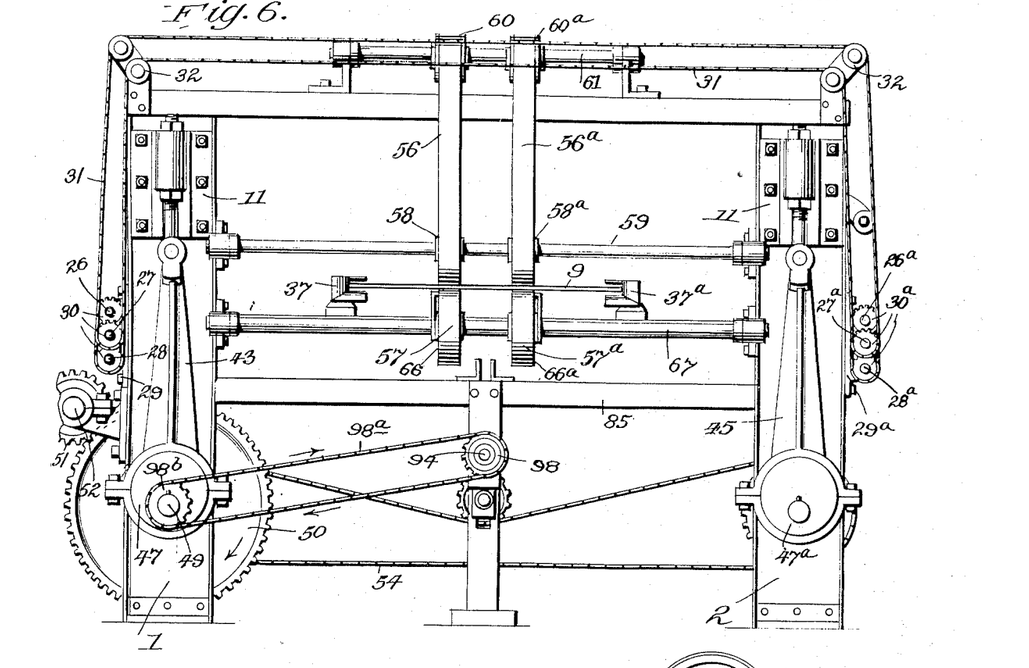
Fig. 6 an end elevation of the intake end of the machine, the knives and supporting elements therefor omitted.

To center the blank with reference to the knives I preferably provide at the intake end of the machine two guides 37 and 37$^a$ (Figs. 1, 2 and 6) said guides being substantially U-shaped in cross section and made flaring at the intake end thereof. Said guides are supported on a cross bar 38 and are adjustable toward and from each other by means of a shaft 39 provided with right and left hand screw threads.

Spool shaped guides 40 and 40$^a$ arranged in opposite pairs are supported upon cross bars 41 mounted for adjustment lengthwise of beams 6 and 7, said guides likewise being adjustable toward and from each other through right and left handed threaded shafts 42. The beams 12 and 12$^a$ are moved up and down to cause the knives to function by pitmen 43, 44, 45 and 46, the first two coöperating with eccentrics 47 and 48 secured to a shaft 49. Said shaft also has secured to it a gear 50 which meshes with a pinion 51 secured to the main driving shaft 52. Eccentrics 45 and 46 are secured to a shaft 53, said shaft being driven from shaft 49 through sprocket chains 54 and 55.

The blanks are fed into and through the machine between two pairs of oppositely disposed endless belts 56 and 57 and 56$^a$ and 57$^a$. The belt 56 passes about an idler pulley 58 mounted upon a shaft 59, then upwardly over an idler 60 upon a shaft 61, thence rearwardly to and over a pulley 62 fast upon a shaft 63, thence downwardly over a pulley 64 secured to a shaft 65. Belt 56$^a$ is similarly arranged. The lower belt 57 passes about an idler 66 mounted upon a shaft 67 at the forward end of the machine and about a pulley 68 secured upon a shaft 69 at the rear of the machine. Belt 57$^a$ is similarly mounted. Said shafts 65 and 69 are driven through gears 70 and 71 secured respectively thereto, which mesh with gears 72 and 73 secured to shafts 74 and 75 which are supported in brackets secured to column 4 (see Fig. 4). Shafts 74 and 75 carry pulleys 76, 77 and a belt 78 passes about the same and over a pulley 79 secured to shaft 63. Said shaft has sleeved on it a belt pulley 80 which is constantly driven and whose inner face forms one element of a clutch, the other element being indicated by 81, Fig. 8. Element 81 is splined to shaft 63 and is urged into frictional engagement with pulley 80 by a spring 82 and is withdrawn therefrom through the action of a shipper lever 83 as the knife carrying beams 13 are lowered. To effect a separation of the clutch elements and thus arrest movement of the feed belts while the blank is being cut or notched, a fixed cam arm 84 is secured to and extends upwardly from the beam 12. When the beam 12, and consequently the cross beams 13, are lowered the clutch is held in its released position. As the parts rise, the cam 84ª on arm 84 allows lever 83 to swing inwardly thereby establishing frictional engagement between the clutch elements with a consequent movement of the feed belts.

Figure 2:
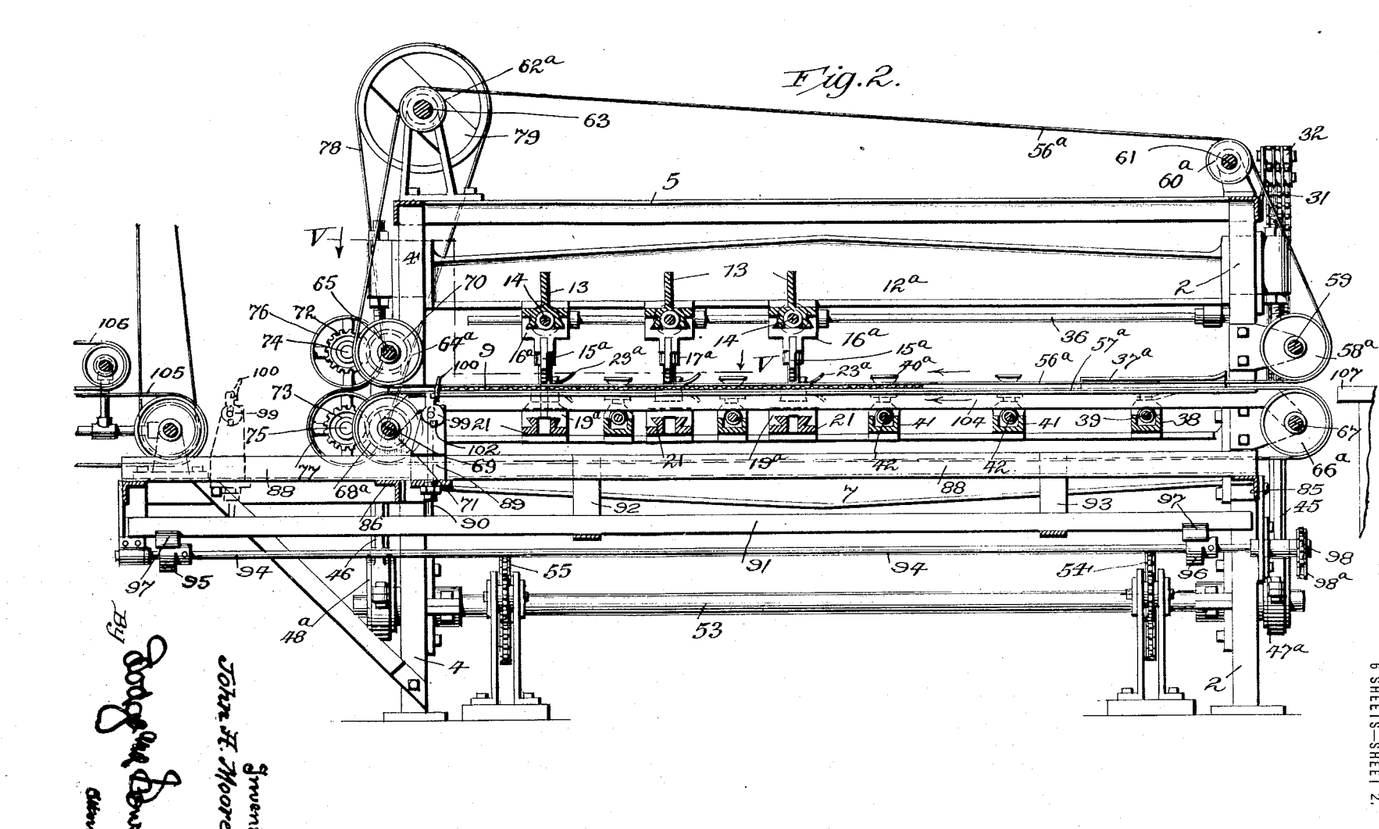
Fig. 2 a vertical longitudinal central sectional view.
Figure 4:
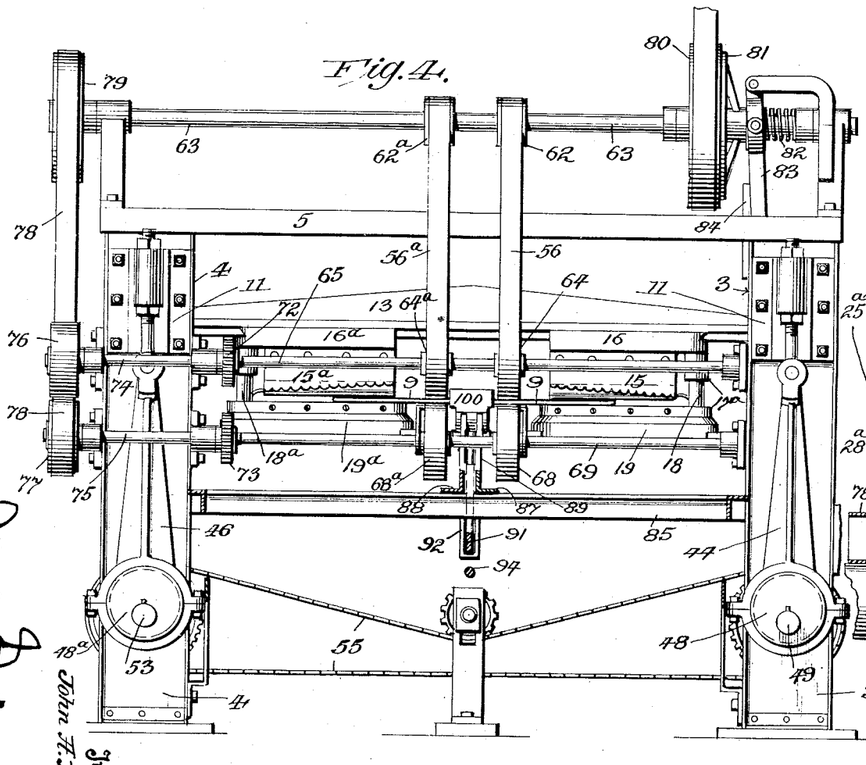
Fig. 4 an end view of the discharge end of the machine.
Figure 5:
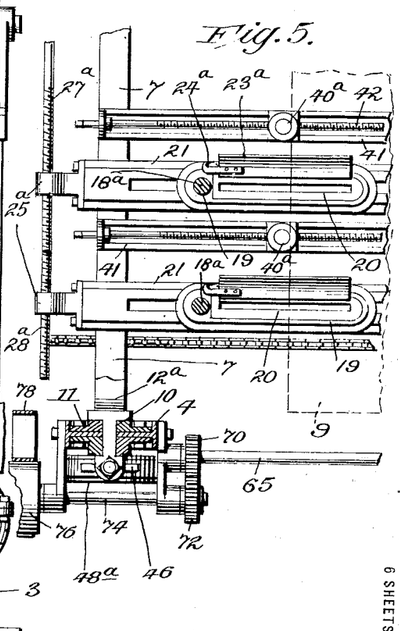
Fig. 5 a horizontal detail sectional view on the line V—V of Fig. 2 showing the edge and adjacent body guides for the blanks.

It is, of course, essential that the blanks be held at rest when the cutting is being effected, and to that end I employ an automatic device, best shown in Figs. 2, 3 and 4, and substantially the same as that set forth in Letters Patent No. 1,286,714, dated December 3, 1918. Extending lengthwise of the machine and supported upon cross angle bars 85 and 86 are two L-shaped bars 87 and 88, said bars at the discharge end of the machine (see Figs. 1 and 2) extending beyond the adjacent columns 3 and 4. Mounted on said bars and adjustable lengthwise thereof is a block 89 in which there is mounted for vertical endwise reciprocation, a stem or shaft 90 which at its lower end bears upon a lifter bar 91 which extends throughout the length of the machine. Said bar 91 is maintained in position between fixed guides 92, 93, which are secured to angle bars 87, 88. Mounted below the bar is a shaft 94 carrying cams 95 and 96 which lie below lifter blocks 97 secured to the bar 91, so that as the shaft rotates the bar will be periodically lifted through the action of the cams. Motion is imparted to the shaft through a sprocket wheel 98 secured thereto, the sprocket being driven by a sprocket chain 98ª (Fig. 6), the chain passing about a second sprocket 98ᵇ secured to and rotating with the shaft 49. The shaft 94 will therefore rotate in timed relation with the eccentrics which actuate the pitmen that effect the raising and lowering of the knives. Mounted in the upper end of block 89 is a head 99 carrying a stop plate 100, the head being pivotally mounted on a cross pin whose ends extend into vertical slots in the block so that the head may be raised and lowered. A spring 101 (Fig. 3) tends to hold the head in the vertical position with the plate 100 in the path of the oncoming stock and to arrest the same. The head is normally held in this position by lugs 102 extending out from block 89, the lugs entering notches in the lower edges of the head. After the blank has been cut the cams elevate bar 91 and the bar pushes stem 90 upwardly and as the upper end of the stem is always in contact with the head the head is raised until it clears the stops 102 whereupon the blank 9 under the action of the feed belts will turn the stop plate down and the blank will pass thereover. As soon as the blank passes free of the stop plate, the spring 101 will swing the head forwardly and the head will resume its locked position in the path of the next oncoming blank, the bar 91 meantime having dropped due to the recession of the cams. The lower feed belts are held up to the blank by a pair of guide bars 103 and 104 which underlie the same so that the blank is caused to properly function with the stop device and with the other elements which act thereon. The cut blanks as they are fed from between the belts pass onto a conveyer belt 105 with which coacts an overlying belt 106. The blanks are preferably slid into the bight of the feed belts from a table 107, Fig. 2.

It is thought that from the foregoing the operation of the machine will be fully understood without a detailed description of the sequence of operations. Suffice it to say that the machine will handle stock of any dimensions (within the limits of the mechine) that the notches may be spaced apart as desired and made of any desired or required depth, and that relative long stock may be handled by positioning the automatic stock or blank arresting means well out on the supporting bars 87 and 88, as for instance in the dotted line position Fig. 2.

While the machine is particularly adapted for cutting or notching corrugated paper board it is equally applicable for use in connection with other stock where a punching action is desirable or essential.

What is claimed is:

1. In a machine for notching blanks, the combination of a supporting frame; at least three cross beams supported for adjustment lengthwise of the frame; means for raising and lowering the beams; knives carried by the beams; a die underlying each knife and adjustable as to position with the knives; and means for feeding the blanks over said dies.

2. In a machine for notching blanks, the combination of a supporting frame; at least three cross beams supported for adjustment lengthwise of the frame; means for raising and lowering the beams; knives carried by the beams; a die underlying each knife and adjustable as to position with the knives; means for feeding the blanks over said dies; and means for arresting the blank when brought to proper position on the dies.

3. In a machine for notching blanks, the combination of a supporting frame; a plurality of cross beams supported for adjustment lengthwise of the frame; means for raising and lowering the beams; a second series of beams underlying those of the first series; knives carried by the first series; dies carried by the second series; and connections between the dies and the overlying elements whereby when the upper cross beams are spaced along the frame the other beams and the dies mounted thereon will be likewise spaced.

4. In a machine for notching blanks, the combination of a supporting frame; a pair of fixed guides extending longitudinally thereof; a plurality of transversely extending supporting bars mounted for adjustment lengthwise of said guides; a pair of movable supporting guides mounted in the frame; means for raising and lowering said guides; a series of cross beams adjustably mounted on said guides; a pair of knives carried by each of said cross beams; corresponding dies carried by the supporting bars; means for securing adjustment of the beams and bars to effect the desired spacing between the knives; and means for positioning the blank to be notched over the dies.

5. In a machine for notching blanks, the combination of a supporting frame; a pair of fixed guides extending longitudinally thereof; a plurality of transversely extending supporting bars mounted for adjustment lengthwise of said guides; a pair of dies carried by each bar; an arm extending upwardly from each die; a pair of movable supporting guides extending lengthwise of the frame and guided thereby; means for simultaneously raising and lowering the guides; a plurality of beams extending from one guide to the other and mounted for adjustment longitudinally thereon; a pair of head blocks mounted on each of said cross beams; a knife extending downwardly from each block; a hollow guide extending downwardly from each block and engaging the arm extending upwardly from the underlying die; and means for moving each of the supporting bars along the fixed guides and consequently shifting the supporting beams.

6. In a machine for notching blanks, the combination of a supporting frame; a pair of fixed guides extending longitudinally thereof; a plurality of transversely extending supporting bars mounted for adjustment lengthwise of said guides; a pair of dies carried by each bar; an arm extending upwardly from each die; a pair of movable supporting guides extending lengthwise of the frame and guided thereby; means for simultaneously raising and lowering the guides; a plurality of beams extending from one guide to the other and mounted for adjustment longitudinally thereon; a pair of head blocks mounted on each of said cross beams; a knife extending downwardly from each block and engaging the arm extending upwardly from the underlying die; means for moving each of the supporting bars along the fixed guides and consequently shifting the supporting beams; and means for feeding the blanks over the dies.

7. In a machine for notching blanks, the combination of a supporting frame; a pair of fixed guides extending longitudinally thereof; a plurality of transversely extending supporting bars mounted for adjustment lengthwise of said guides; a pair of dies carried by each bar; an arm extending upwardly from each die; a pair of movable supporting guides extending lengthwise of the frame and guided thereby; means for simultaneously raising and lowering the guides; a plurality of beams extending from one guide to the other and mounted for adjustment longitudinally thereon; a pair of head blocks mounted on each of said cross beams; a knife extending downwardly from each block and engaging the arm extending upwardly from the underlying die; means for moving each of the supporting bars along the fixed guides and consequently shifting the supporting beams; means for feeding the blanks over the dies; and means for arresting the blanks when they come to proper position with reference to the dies and knives.

8. In a machine for notching blanks, the combination of a supporting frame; a pair of fixed guides extending longitudinally thereof; a plurality of transversely extending supporting bars mounted for adjustment lengthwise of said guides; a pair of dies carried by each bar; an arm extending upwardly from each die; a pair of movable supporting guides extending lengthwise of the frame and guided thereby; means for simultaneously raising and lowering the guides; a plurality of beams extending from one guide to the other and mounted for adjustment longitudinally thereon; a pair of head blocks mounted on each of said cross beams; a knife extending downwardly from each block; a hollow guide extending downwardly from each block and engaging the arm extending upwardly from the underlying die; means for moving each of the supporting bars along the fixed guides and consequently shifting the supporting beams; and means for effecting adjustment of the head blocks of each pair toward and from each other, with a consequent adjustment of the underlying dies.

9. In a machine for notching blanks, the combination of a supporting frame; a pair of fixed guides extending longitudinally thereof; a plurality of transversely extending supporting bars mounted for adjustment lengthwise of said guides; a pair of dies carried by each bar; an arm extending upwardly from each die; a pair of movable supporting guides extending lengthwise of the frame and guided thereby; means for simultaneously raising and lowering the guides; a plurality of beams extending from one guide to the other and mounted for adjustment longitudinally thereon; a pair of head blocks mounted on each of said cross beams; a knife extending downwardly from each block; a hollow guide extending downwardly from each block and engaging the arm extending upwardly from the underlying die; means for moving each of the supporting bars along the fixed guides and consequently shifting the supporting beams; and means for effecting a simultaneous adjustment of each pair of head blocks toward and from each other with a consequent adjustment of the coöperating dies.

10. In a machine for notching blanks, the combination of a die; a knife operating therewith; means for moving the knife into and out of operative relation to the die; a feed mechanism for carrying the blanks into position with reference to the die; means actuated by the knife moving means for rendering the feed mechanism inoperative as the knife makes its cutting stroke; and a stop serving to limit the travel of the blank and to bring it to rest in operative position with the die and knife.

11. In a machine for notching blanks, the combination of notching mechanism; a feed mechanism for positioning the blank in proper relation to the notching mechanism; means actuated by the notching mechanism for temporarily arresting the feed mechanism as the notching mechanism is effecting the notching action; and a retreating stop for arresting the travel of the blank to position the same in proper relation to the notching mechanism.

12. In a machine for notching blanks, the combination of notching mechanism; a power driven feed mechanism for positioning the blank in proper relation thereto; means actuated by the notching mechanism for temporarily arresting the action of the feed mechanism while the notching mechanism is effecting its notching action; and means acting in timed relation with the notching mechanism for arresting the movement of the stock.

13. In a machine for notching blanks, the combination of notching mechanism; means for actuating the same; feed belts for presenting the stock to be notched; means for driving said belts, including a friction clutch; means for releasing said clutch as the notching mechanism is effecting its notching action; a retreating stop for arresting the stock; and means actuted in timed relation with the notching mechanism for releasing said stop.

14. In a machine for notching blanks, the combination of notching mechanism; means for actuating the same; feed belts for presenting the stock to be notched; means for driving said belts, including a friction clutch; means for releasing said clutch as the notching mechanism is effecting its notching action; and means acting in timed relation with the notching mechanism for arresting the movement of the stock.

15. In a machine for notching blanks, the combination of a suitable frame; a pair of horizontally disposed beams extending longitudinally thereof; a pitman connected to the end of each beam; eccentrics for actuating said pitmen to raise and lower the beams in unison; a plurality of cross beams supported by said first named beams and adjustable lengthwise thereof; a pair of head blocks mounted on each of said cross beams; means for effecting simultaneous adjustment of each pair of blocks toward and from each other; a knife carried by each head block; a hollow lug extending downwardly from each block; a pair of fixed beams extending longitudinally of the machine and in a plane below the knives; a series of cross bars mounted for adjustment longitudinally of said fixed beams; a pair of dies movably mounted on each of said cross bars; an arm extending up from each die and entering the corresponding hollow lug; and means for effecting an adjustment of said cross bars toward and from each other and a consequent like adjustment of the cross beams.

16. In a machine for notching blanks, the combination of a suitable frame; a pair of horizontally disposed beams extending longitudinally thereof; a pitman connected to the end of each beam; eccentrics for actuating said pitmen to raise and lower the beams in unison; a plurality of cross beams supported by said first named beams and adjustable lengthwise thereof; a pair of head blocks mounted on each of said cross beams; means for effecting simultaneous adjustment of each pair of blocks toward and from each other; a knife carried by each head block; a hollow lug extending downwardly from each block; a pair of fixed beams extending longitudinally of the machine and in a plane below the knives; a series of cross bars mounted for adjustment longitudinally of said fixed beams; a pair of dies movably mounted on each of said cross bars; an arm extending up from each die and entering the corresponding hollow lug; means for effecting an adjustment of said cross bars toward and from each other and a consequent like adjustment of the cross beams; and a plurality of adjustable edge guides for the blanks.

17. In a machine for notching blanks, the combination of a suitable frame; a pair of horizontally disposed beams extending longitudinally thereof; a pitman connected to the end of each beam; eccentrics for actuating said pitmen to raise and lower the beams in unison; a plurality of cross beams supported by said first named beams and adjustable lengthwise thereof; a pair of head blocks mounted on each of said cross beams; means for effecting simultaneous adjustment of each pair of blocks toward and from each other; a knife carried by each head block; a hollow lug extending downwardly from each block; a pair of fixed beams extending longitudinally of the machine and in a plane below the knives; a series of cross bars mounted for adjustment longitudinally of said fixed beams; a pair of dies movably mounted on each of said cross bars; an arm extending up from each die and entering the corresponding hollow lug; means for effecting an adjustment of said cross bars toward and from each other and a consequent like adjustment of the cross beams; a plurality of adjustable edge guides for the blanks; and a plurality of pairs of endless belts for feeding the blanks between the guides and over the dies.

18. In a machine for notching blanks, the combination of a suitable frame; a pair of horizontally disposed beams extending longitudinally thereof; a pitman connected to the end of each beam; eccentrics for actuating said pitmen to raise and lower the beams in unison; a plurality of cross beams supported by said first named beams and adjustable lengthwise thereof; a pair of head blocks mounted on each of said cross beams; means for effecting simultaneous adjustment of each pair of blocks toward and from each other; a knife carried by each head block; a hollow lug extending downwardly from each block; a pair of fixed beams extending longitudinally of the machine and in a plane below the knives; a series of cross bars mounted for adjustment longitudinally of said fixed beams; a pair of dies movably mounted on each of said cross bars; an arm extending up from each die and entering the corresponding hollow lug; means for effecting an adjustment of said cross bars toward and from each other and a consequent like adjustment of the cross beams; a plurality of adjustable edge guides for the blanks; a plurality of pairs of endless belts for feeding the blanks between the guides and over the dies; and means for arresting the blanks in proper position with reference to the dies and knives.

In testimony whereof I have signed my name to this specification.

JOHN A. MOORE.